United States Patent
Lu et al.

(10) Patent No.: US 12,318,763 B2
(45) Date of Patent: Jun. 3, 2025

(54) Z-TYPE HETEROJUNCTION COMPOSITE MATERIAL OF TUNGSTEN OXIDE NANOROD/TITANIUM CARBIDE QUANTUM DOT/INDIUM SULFIDE NANOSHEET, PREPARATION METHOD THEREFOR AND APPLICATION THEREOF

(71) Applicant: SOOCHOW UNIVERSITY, Suzhou (CN)

(72) Inventors: Jianmei Lu, Suzhou (CN); Najun Li, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 368 days.

(21) Appl. No.: 18/011,835

(22) PCT Filed: Jun. 17, 2021

(86) PCT No.: PCT/CN2021/100751
§ 371 (c)(1),
(2) Date: Dec. 20, 2022

(87) PCT Pub. No.: WO2022/041959
PCT Pub. Date: Mar. 3, 2022

(65) Prior Publication Data
US 2023/0249161 A1 Aug. 10, 2023

(30) Foreign Application Priority Data
Aug. 31, 2020 (CN) .......................... 202010901547.4

(51) Int. Cl.
*B01J 27/00* (2006.01)
*B01J 23/30* (2006.01)
(Continued)

(52) U.S. Cl.
CPC ............... *B01J 27/22* (2013.01); *B01J 23/30* (2013.01); *B01J 27/04* (2013.01); *B01J 35/39* (2024.01);
(Continued)

(58) Field of Classification Search
None
See application file for complete search history.

(56) References Cited

FOREIGN PATENT DOCUMENTS

| CN | 102335616 A | * | 2/2012 |
|---|---|---|---|
| CN | 110038607 A | | 7/2019 |

(Continued)

OTHER PUBLICATIONS

CN-102335616-A, English translation (Year: 2012)*
(Continued)

*Primary Examiner* — Stefanie J Cohen
(74) *Attorney, Agent, or Firm* — SZDC Law PC

(57) ABSTRACT

Disclosed are a Z-type heterojunction composite material of a tungsten oxide nanorod/a titanium carbide quantum dot/an indium sulfide nanosheet, a preparation method therefor and an application thereof. The method includes: preparing a titanium carbide quantum dot by using freeze-thaw and ultrasound methods for multiple times, and then placing a tungsten trioxide nanorod prepared by a hydrothermal method into a titanium carbide quantum dot aqueous solution, stirring same, and then standing same to obtain a tungsten oxide nanorod loading a quantum dot; stirring and uniformly mixing an indium compound and a sulfur compound in an ethylene glycol solvent, and then adding the tungsten oxide nanorod loading the quantum dot, and performing a reflux reaction at constant temperature to obtain the composite material. The titanium carbide quantum dot of the present invention can provide good electron transport channels at different semiconductor interfaces.

10 Claims, 4 Drawing Sheets

(51) Int. Cl.
  *B01J 27/04* (2006.01)
  *B01J 27/22* (2006.01)
  *B01J 35/39* (2024.01)
  *C02F 1/30* (2023.01)
  *C02F 1/72* (2023.01)
  *C02F 101/22* (2006.01)
  *C02F 101/34* (2006.01)

(52) U.S. Cl.
  CPC ............... *C02F 1/30* (2013.01); *C02F 1/725* (2013.01); *C02F 2101/22* (2013.01); *C02F 2101/345* (2013.01); *C02F 2305/10* (2013.01)

(56) References Cited

FOREIGN PATENT DOCUMENTS

| | | |
|---|---|---|
| CN | 111495401 A | 8/2020 |
| CN | 111974427 A | 11/2020 |

OTHER PUBLICATIONS

Ran et al, Ti3C2 Mxene co-catalyst on metal sulfide photoabsorbers for enhanced visible-light photocatalytic hydrogen production, nature communications, pub-Jan. 3, 2017, pp. 1-10 (Year: 2017).*

Qingran Zhang et al., "Efficient Z-scheme photocatalyst from simultaneous decoration of In2S3 nanosheets and WO3 nanorods on graphene sheets" 2016 Nanotechnology 27, 285602 (Jun. 6, 2016).

Qiaoran Liu et al., "MXene as a non-metal charge mediator in 2D layered CdS@Ti3C2@TiO2 composites with superior Z-scheme visible light-driven photocatalytic activity" Environ. Sci.: Nano, 2019, 6, 3158 (Aug. 6, 2019).

* cited by examiner

Z-TYPE HETEROJUNCTION COMPOSITE MATERIAL OF TUNGSTEN OXIDE NANOROD/TITANIUM CARBIDE QUANTUM DOT/INDIUM SULFIDE NANOSHEET, PREPARATION METHOD THEREFOR AND APPLICATION THEREOF

This application is the National Stage Application of PCT/CN2021/100751, filed on Jun. 17, 2021, which claims priority to Chinese Patent Application No. 202010901547.4, filed on Aug. 31, 2020, which is incorporated by reference for all purposes as if fully set forth herein.

TECHNICAL FIELD

The invention relates to the technical field of inorganic nanocomposite materials and photocatalytic technology, in particular to a method for preparing $WO_3$ nanorods/$Ti_3C_2$ quantum dots/$In_2S_3$ nanosheets Z-scheme heterojunction composite material, and the application of highly efficient removal of bisphenol A and Cr (VI) in water under visible light.

BACKGROUND TECHNOLOGY

Sunlight is an inexhaustible energy source. The photocatalytic degradation of pollutants is one of the most effective methods for removing pollutants in recent years due to its green, energy-saving, and high-efficiency characteristics. With the development of catalytic technology, quantum-dots materials have gradually shown strong competitiveness in recent research. Quantum dots with particle size generally ranging from 1-100 nm are 0D nanomaterials. Due to the smaller volume, the quantum confinement will lead to the expansion of the band gap, so that the quantum dots have better tunability of physical and chemical properties, more active edge sites and better dispersion. As a transition metal carbide, the new two-dimensional layered compound $Ti_3C_2$ has good electrical conductivity, chemical stability and abundant active catalytic sites. The prior art provides an organic-inorganic hybrid ultrafiltration membrane, which uses $Ti_3AlC_2$ as the precursor particles. The precursor particles are sequentially acid-dissolved to remove Al, and the surface is modified by acetylation. $Ti_3AlC_2$ has a porous structure after removing Al, which increases the water flux. And after acetylation modification, the surface roughness of the prepared ultrafiltration membrane is significantly reduced, and it shows better pollution resistance in the filtration of polymer pollution systems. The prior art discloses the preparation of cubic titanium dioxide/two-dimensional layered nano $Ti_3C_2$. The method firstly synthesized high-purity ternary layered $Ti_3AlC_2$ ceramic blocks, and then high-energy ball-milled into fine powder. Afterward, it was immersed in hydrofluoric acid solution for a while. Then it was centrifuged with deionized water and dried to obtain the two-dimensional layered nanomaterial MXene-$Ti_3C_2$. The active Ti terminal surface of MXene-$Ti_3C_2$ was heat-treated to form $TiO_2$ under oxidizing condition, which is $TiO_2$/MXene-$Ti_3C_2$ nanocomposite. MXene-$Ti_3C_2$ has uniform lamellae, a large specific surface area and good electrical conductivity. $TiO_2$ has the characteristics of small particles, uniform distribution and good photocatalytic performance. These advantages are conducive to applications in photocatalysis, wastewater treatment, lithium-ion batteries, supercapacitors and biosensors. However, there has not been a report on the preparation of two-dimensional layered compound $Ti_3C_2$ into quantum dots to construct Z-scheme heterojunction composite material for water treatment.

Technical Solutions

The present invention aims to provide a preparation method of $WO_3$/$Ti_3C_2$ QDs/$In_2S_3$ Z-scheme heterojunction composite material that responds to visible light. The as-obtained composite material can respectively realize the effective removal of Bisphenol A and Cr (VI) in water under the irradiation of visible light.

In this invention, $Ti_3C_2$ quantum dots are prepared by a multiple freeze-thaw-ultrasound method, and then the tungsten trioxide nanorods prepared by a hydrothermal method are placed in a $Ti_3C_2$ quantum dot aqueous solution. The components are stirred and then allowed to stand to obtain the tungsten oxide nanorods loaded with quantum dots. After the indium compound and the sulfur compound are stirred and mixed uniformly, the above-mentioned quantum dot-loaded tungsten oxide nanorods are added and the reaction re refluxed at a constant temperature to obtain $WO_3$/$Ti_3C_2$ QDs/$In_2S_3$ Z-scheme heterojunction. In the present invention, the $Ti_3C_2$ quantum dots can provide excellent electron transmission channels at different semiconductor interfaces, and the constructed material can directly absorb and utilize visible light, which improves the utilization rate of the material to sunlight. Compared with the $WO_3$/$In_2S_3$ without introducing quantum dots, the Z-scheme heterojunction constructed by the present invention can significantly improve the photocatalytic efficiency. Moreover, experiments have confirmed that the performance of $WO_3$/$Ti_3C_2$ QDs/$In_2S_3$ in the removal of bisphenol A and Cr (VI) under visible light is significantly better than that of $WO_3$/$In_2S_3$.

To achieve the above purposes, the specific technical proposal of the present invention is as follows:

The invention provided a preparation method of $WO_3$/$Ti_3C_2$ QDs/$In_2S_3$ Z-scheme heterojunction composite material. The steps include the followings: $Ti_3C_2$ quantum dots are prepared by a freeze-thaw-ultrasonic method, and then the $WO_3$ nanorods prepared by the hydrothermal method are placed in an aqueous solution of $Ti_3C_2$ QDs. The components are stirred and then allowed to stand to obtain the tungsten oxide nanorods loaded with quantum dots. After the indium compound and the sulfur compound are stirred and mixed uniformly, the above-mentioned quantum dot-loaded tungsten oxide nanorods are added and the reaction is refluxed at a constant temperature to obtain $WO_3$/$Ti_3C_2$ QDs/$In_2S_3$ Z-scheme heterojunction composite material.

A method for removing pollutants in water include the following steps: $Ti_3C_2$ quantum dots are prepared by the freeze-thaw-ultrasonic method, and then the $WO_3$ nanorods prepared by the hydrothermal method are placed in an aqueous solution of $Ti_3C_2$ QDs. The components re stirred and then allowed to stand to obtain the tungsten oxide nanorods loaded with quantum dots. After the indium compound and the sulfur compound are stirred and mixed uniformly, the above-mentioned quantum dot-loaded tungsten oxide nanorods are added and the reaction is refluxed at a constant temperature to obtain $WO_3$/$Ti_3C_2$ QDs/$In_2S_3$ Z-scheme heterojunction. The as-obtained material is added to the pollutant-containing water body to complete the treatment of the pollutant-containing water body. The $WO_3$/$Ti_3C_2$ QDs/$In_2S_3$ Z-scheme heterojunction composite material is added into the solution containing organic pollutants, and the removal of pollutants is realized under the effect of light.

In the present invention, the indium compound is indium trichloride tetrahydrate or indium nitrate 4.5-hydrate, etc., preferably indium trichloride tetrahydrate. The sulfur compound is sodium sulfide nonahydrate, thioacetamide, or thiourea, etc., preferably thioacetamide. And the solvent is alcohol, preferably ethylene glycol.

In the present invention, a mixture of LiF and HCl is used to etch $Ti_3C_2$ aluminide to prepare two-dimensional transition metal carbide $Ti_3C_2$ nanosheets, and then the nanosheets are treated with multiple freeze-thaw method and water bath ultrasound to obtain $Ti_3C_2$ quantum dots. The mixed sodium tungstate dihydrate, NaCl, HCl, and water re hydrothermally reacted to obtain $WO_3$ nanorods of uniform size.

The invention adopts a relatively milder and safer method (LiF/HCl) for etching $Ti_3AlC_2$, so that the bulk $Ti_3AlC_2$ became $Ti_3C_2T_x$ with larger layers (where T is fluorine or hydroxyl). To prevent oxidation, inert gas is blown into the etched solution before subsequent processing. Preferably, the sample is subjected to freeze-thaw treatment before ultrasonic in the water bath. Further, the freeze-thaw treatment is refrigeration-freeze-thaw, a refrigeration temperature of is 0° C.-5° C., a freezing temperature of is −80° C.--20° C., a thaw temperature is room temperature, and the process is repeated 2-6 times, preferably 5 times. For example, in the process of multiple freeze-thaw for etching two-dimensional transition metal carbide nanosheet solution, the sample is frozen using liquid nitrogen or a −40° C. freezer, preferably a −40° C. freezer. The sample is immediately placed to thaw under room temperature. The freezing and thawing process is repeated 4-6 times, preferably 5 times.

In the present invention, the output power of the water bath ultrasound is 150-300 W, and the time is 1-2 h.

The invention adopts a gentle multiple freeze-thaw method to improve the yield of peeling off the multilayer titanium carbide, and the volume expansion of the intercalation water can promote the peeling of the titanium carbide nanosheets. During the operation, the preferred 4° C. pretreatment promotes more water molecules with lower density, so that the intercalated water can exert stronger extrusion force. It further causes the van der Waals bond in the layered material to break and promotes the peeling of the two-dimensional nanosheet. And after five cycles, the single-layer titanium carbide yield increases and then combines with 150 W ultrasound treatment for 1 hour to prepare titanium carbide quantum dots. The bulk of titanium carbide is removed after filtration through a 0.22 μm microporous membrane, and finally, titanium carbide quantum dots with uniform particle size are obtained.

In the present invention, $Na_2WO_4·2H_2O$ and NaCl are added into water, and then HCl with a concentration of 3-6 mol/L is used to adjust the pH to 2-3, preferably 3 mol/L HCl is used to adjust the pH of the solution to 2. The temperature of the hydrothermal reaction is 160-180° C., preferably 180° C. The hydrothermal time is 24-28 h, preferably 24 h.

In the present invention, a mass ratio of the $Ti_3C_2$ QDs and the $WO_3$ nanorods is 0.09-0.15:1, preferably the mass ratio is 0.12:1. The stirring speed is 500-2000 rpm, and the stirring time is 8-15 h, and the standing time is 10-15 h, preferably 12 h.

In the present invention, a molar ratio of the indium element of the indium compound and the sulfur element of the sulfur compound is 2:3. The molar ratio of the indium element of the indium compound and the tungsten element in the tungsten trioxide is 2.4-3.2:1, preferably 2.8:1.

In the present invention, the temperature of the reflux reaction is 90-105° C., preferably 95° C., and the time is 1-2 h, preferably 1.5 h. The reflux reaction is protected by an inert gas, and the inert gas is argon. After the reflux reaction is completed, the cooled reaction product is taken out and washed with a mixed solvent of water and ethanol, then the sample is vacuum dried to obtain $WO_3/Ti_3C_2$ QDs/$In_2S_3$.

The invention constructs a Z-scheme heterojunction integrating 0D quantum dots, 1D nanorods, and 2D nanosheets, which increases the contact between reactants and catalytic active sites, thereby improving the catalytic efficiency of photocatalysis. 0D $Ti_3C_2$ QDs have good dispersibility and water solubility, which provide electron transmission channels at the junction of 1D $WO_3$ nanorods and 2D $In_2S_3$ nanosheets, thereby enhancing the photocatalytic activity of the photocatalyst.

BENEFICIAL EFFECT

The present invention has the following advantages:

The Z-scheme heterojunction of 0D QDs, 1D nanorods, and 2D nanosheets disclosed in the present invention uses low cost of raw materials, simple operation, and easy preparation, which is beneficial to its further popularization and application;

The Z-scheme heterojunction of 0D quantum dots, 1D nanorods and 2D nanosheets disclosed in the present invention has strong absorption in the visible light region of 400~600 nm, so it is a visible light catalytic material with excellent performance;

The Z-scheme heterojunction of 0D quantum dots, 1D nanorods, and 2D nanosheets of the present invention has a lower fluorescence intensity, and the introduction of the 0D quantum dots improves the catalytic activity of the catalyst.

SPECIFIC EXAMPLES METHOD

Figure 1:
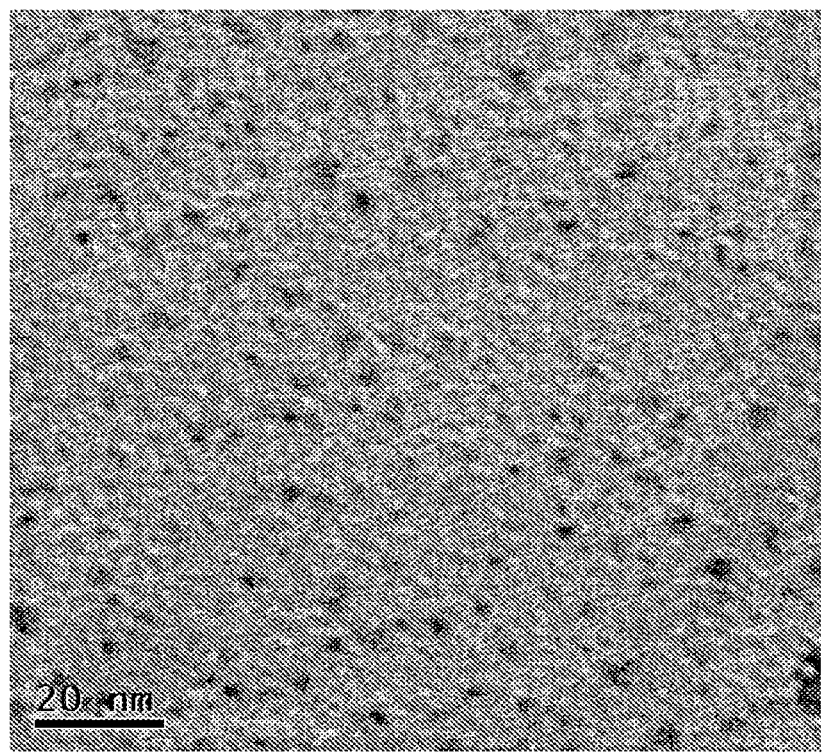
FIG. 1 TEM image of titanium carbide quantum dots ($Ti_3C_2$ QDs)

The present invention uses simple preparation methods to construct Z-scheme heterojunction composite material with 0D QDs, 1D nanorods, and 2D nanosheets for the degradation of hexavalent chromium and bisphenol A. Among them, 0D transition metal carbide quantum dots with good metal-like conductivity are a good dielectric material.

As traditional semiconductor materials, tungsten trioxide, and indium sulfide have been widely used in the field of catalysis, but the treatment effect of pollutants in water needs to be improved. In the $WO_3/Ti_3C_2$ QDs/$In_2S_3$ Z-scheme heterojunction disclosed in the present invention, the combination of $Ti_3C_2$ QDs with excellent conductivity as the electron transfer medium can extend the ultraviolet response of the $WO_3$ with a wide band gap to the visible light region. At the same time, it also solves the problem of easy agglomeration of nano-scale materials and greatly improves the utilization rate of the photogenerated electron.

The invention provided a preparation method of $WO_3$/$Ti_3C_2$ QDs/$In_2S_3$ Z-scheme heterojunction. The steps are as follows: $Ti_3C_2$ quantum dots are prepared by a freeze-thaw-ultrasonic method, and then the $WO_3$ nanorods prepared by the hydrothermal method re placed in an aqueous solution of $Ti_3C_2$ QDs. The components are stirred and then allowed to stand to obtain the tungsten oxide nanorods loaded with quantum dots. After the indium compound and the sulfur compound re stirred and mixed uniformly, the above-mentioned quantum dot-loaded tungsten oxide nanorods are added and the reaction is refluxed at a constant temperature to obtain $WO_3$/$Ti_3C_2$ QDs/$In_2S_3$ Z-scheme heterojunction.

The $Ti_3C_2$ QDs of the present invention can provide excellent electron transmission channels at different semiconductor interfaces, and the as-obtained composite material can directly absorb and utilize visible light, which solves the problem that $WO_3$ only generates light response in the ultraviolet light region.

The starting materials involved in the present invention are all commercially available conventional products. Simultaneously the specific operation methods and test methods are all conventional in the field. If the temperature and gas environment are not specified, they are all carried out at room temperature.

Examples 1: Preparation of $Ti_3C_2$ QDs

In the centrifuge tube, 0.8 g of lithium fluoride was added to 10 mL of 9 mol/L hydrochloric acid, and then 0.45 g of titanium carbide aluminide was added. Then the sample was stirred for a while at room temperature for etching, the reaction product was washed to pH 6. Immediately afterward, deionized water was added again, and the layered titanium carbide solution was obtained by shaking it by hand for 10 minutes. Argon gas was bubbled into the titanium carbide solution in the centrifuge tube for 5 minutes, then the freeze-thaw operation was performed 5 times: The sample was first placed in a refrigerator at 4° C. for 3 h, then placed in another refrigerator at −40° C. for 3 h, and finally placed in a room temperature environment to thaw. So far, one freeze-thaw process has been completed, and this process was repeated 4 more times. After 5 times of freeze-thaw operation, the layered titanium carbide solution was sonicated at 150 W for 1 h at room temperature to obtain a solution containing titanium carbide flakes and quantum dots. This solution was filtered three times through a 0.22 μm microporous membrane to filter out the flake titanium carbide, and finally, an aqueous solution (100 mg/L) containing a large amount of $Ti_3C_2$ QDs was obtained, which was used in Examples 3.

FIG. 1 is TEM image of titanium carbide quantum dots ($Ti_3C_2$ QDs) obtained above. From the above figure, it can be clearly seen that the $Ti_3C_2$ QDs have relatively high content and are uniformly dispersed.

Examples 2: Preparation of $WO_3$ Nanorods 0.825 g of $Na_2WO_4·2H_2O$ and 0.4 g of NaCl were added to 20 mL of deionized water and stirred for 30 min. 3 mol/L hydrochloric acid solution was added dropwise to the above solution, and the pH meter was used to detect during the dropwise addition to make the solution pH=2. Then the solution was transferred to the reactor for the hydrothermal reaction. The hydrothermal reaction temperature was 180° C., and the hydrothermal time was 24 hours to obtain a dispersion of tungsten trioxide nanorods. After centrifugal washing, it was placed in a 65° C. drying oven and dried overnight to obtain $WO_3$ nanorods powder.

Figure 2:
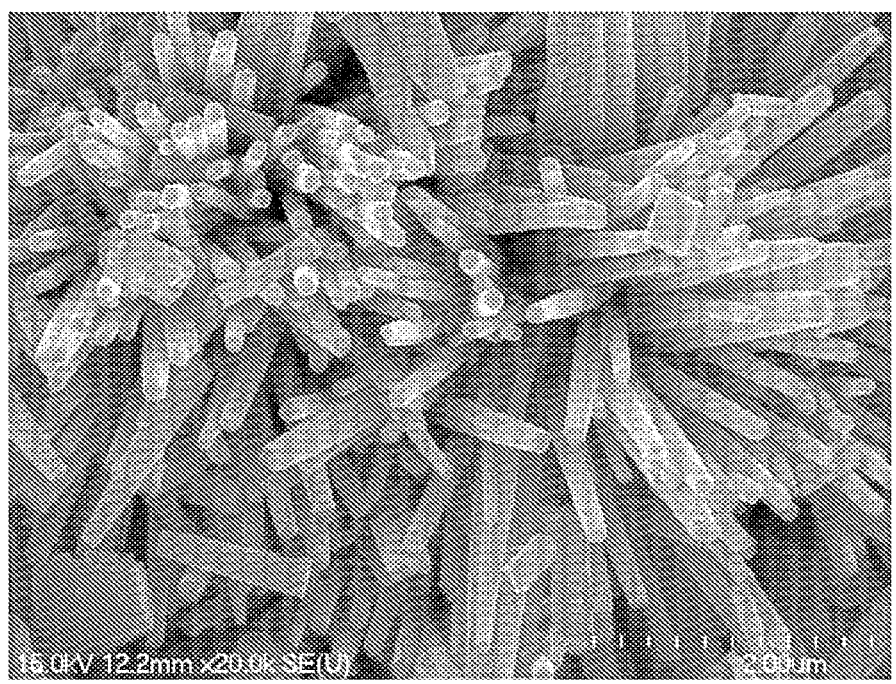
FIG. 2 SEM image of Tungsten trioxide nanorod ($WO_3$ nanorods)

FIG. 2 is SEM image of the $WO_3$ obtained above. It can be seen from the above figure that the $WO_3$ has a nanorod structure and is uniformly dispersed.

Examples 3: Preparation of $WO_3$/$Ti_3C_2$ QDs/$In_2S_3$ Z-Scheme Heterojunction 0.1 g of the $WO_3$ nanorods powder of Examples 2 was added to 120 mL of $Ti_3C_2$ QDs aqueous solution. The mixture was stirred (1000 rpm) in a vacuum environment for 12 h and then lyophilized to obtain quantum dot-loaded $WO_3$ nanorods powder. 57.95 mg (1 mmol) of quantum dot-loaded $WO_3$ powder was dispersed in 10 mL of ethylene glycol, and 205 mg (2.8 mmol) of $InCl_3·4H_2O$ was dissolved in 15 mL of ethylene glycol. The two solutions were mixed in the flask, and 79 mg (4.2 mmol) of thioacetamide was added. Then the flask was connected to the spherical condenser and the three-way valve, and the interface was sealed. Firstly, the air in the flask and condenser tube was sucked away by the vacuum pump, and then argon was blown in. Finally, the above device was placed in an oil bath at 95° C. and refluxed for 90 min. After the reflux, the flask was put into an ice-water mixture to quickly cool down, and the cooled reaction product was washed and dried to a constant weight in a vacuum drying oven to obtain $WO_3$/$Ti_3C_2$ QDs/$In_2S_3$ Z-scheme heterojunction.

Figure 3:
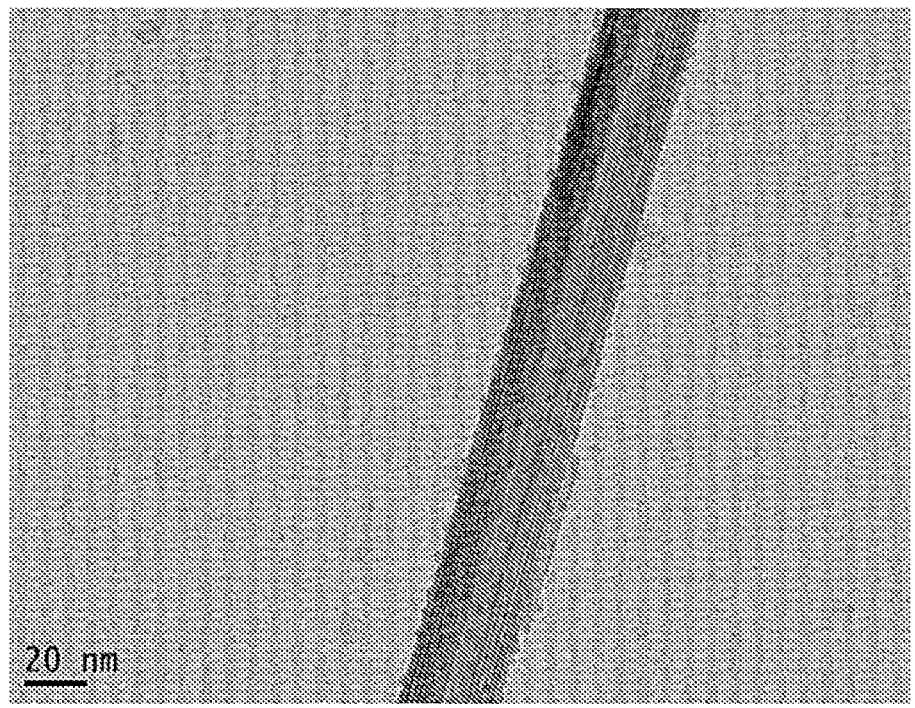
FIG. 3 TEM image of tungsten trioxide nanorods loaded with titanium carbide quantum dots ($WO_3/Ti_3C_2$ QDs)
Figure 4:
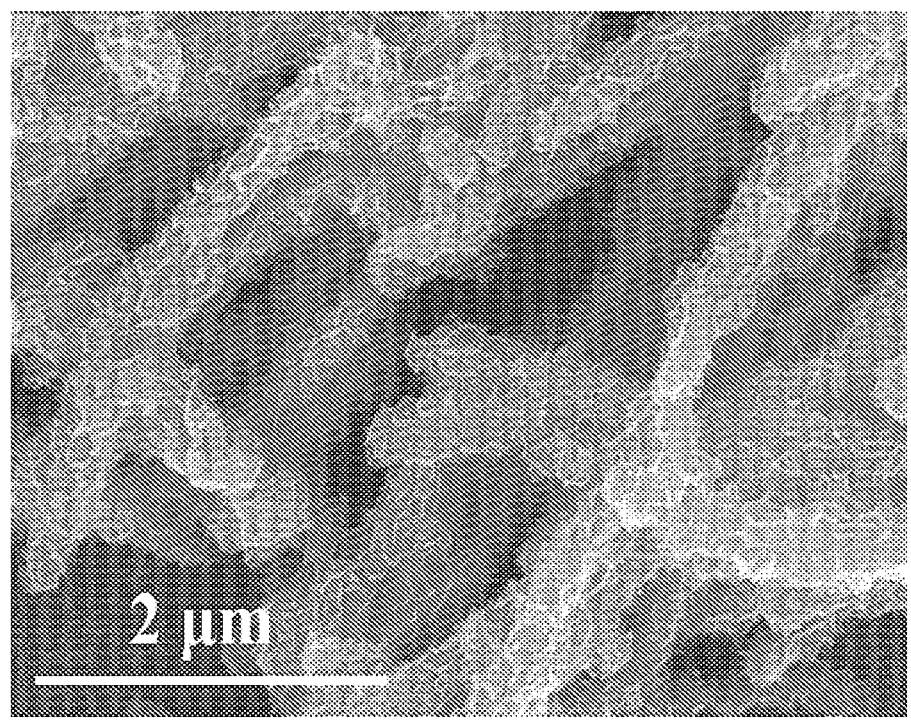
FIG. 4 SEM image of Z-scheme heterojunction of tungsten oxide nanorods/titanium carbide quantum dots/indium sulfide nanosheets ($WO_3/Ti_3C_2$ QDs/$In_2S_3$)

FIG. 3 is TEM image of $WO_3$/$Ti_3C_2$ QDs, and FIG. 4 is SEM image of Z-scheme heterojunction of $WO_3$/$Ti_3C_2$ QDs/$In_2S_3$. It can be seen from the above figure that the quantum dots are uniformly loaded on the tungsten trioxide nanorods. $WO_3In_2S_3$ and $WO_3$/$Ti_3C_2$ QDs/$In_2S_3$ are similar in appearance after growing $In_2S_3$ nanosheets on $WO_3$ nanorods.

Control Examples 1: Preparation of $Ti_3C_2$ QDs by Ultrasonic Method

The layered $Ti_3C_2$ solution obtained according to the method of Examples 1 was placed in a centrifuge tube, and argon was continuously bubbled in for 5 minutes, then it was sonicated at 150 W at room temperature for 1 hour to obtain an aqueous solution containing $Ti_3C_2$ nanosheets and quantum dots. This solution was filtered through a 0.22 μm microporous membrane three times to remove large pieces of $Ti_3C_2$, and finally, an aqueous solution of titanium carbide quantum dots of uniform size (55 mg/L) was obtained. It can be seen that in parallel experiments, the yield was lower than the freeze-thaw-ultrasonic method.

The layered titanium carbide solution obtained according to the method of Examples 1. Afterward, argon gas was bubbled into the titanium carbide solution in the centrifuge tube for 5 minutes, then the freeze-thaw operation was performed 5 times: The sample was placed in a refrigerator at −40° C. for 3 h, and placed in a room-temperature environment to thaw. So far, one freeze-thaw process has been completed, and this process was repeated 4 more times. After 5 times of freeze-thaw operation, the layered titanium carbide solution was sonicated at 150 W for 1 h at room temperature to obtain a solution containing titanium carbide flakes and quantum dots. This solution was filtered three times through a 0.22 μmicroporous membrane to filter out the flake titanium carbide, and finally, an aqueous solution (75 mg/L) containing a large amount of $Ti_3C_2$ QDs was obtained.

Control Examples 2: Preparation of $In_2S_3$ Nanosheets 205 mg of $InCl_3·4H_2O$ was dissolved in 15 mL of ethylene glycol, then 79 mg of thioacetamide was added. The reactants were then placed in an oil bath and refluxed at 95° C. for 90 min. After the reflux, the flask was placed in a mixture of ice and water to quickly cool down. The cooled reaction product was washed with a mixed solvent of ethanol and water and then dried to a constant weight in a vacuum drying oven to obtain $In_2S_3$ nanosheets.

Control Examples 3: Preparation of $WO_3In_2S_3$ 0.1 g of the $WO_3$ powder of Examples 2 was dispersed in 10 mL of ethylene glycol, and another 205 mg of $InCl_3·4H_2O$ was dissolved in 15 mL of ethylene glycol. The two evenly dispersed solutions were uniformly mixed, then 79 mg of thioacetamide was added. The reactants were then placed in an oil bath and refluxed at 95° C. for 90 min. After the reflux, the flask was placed in a mixture of ice and water to quickly cool down. The cooled reaction product was washed with a mixed solvent of ethanol and water and then dried to a constant weight in a vacuum drying oven to obtain $WO_3In_2S_3$.

Examples 4: Photocatalytic Activity of $WO_3/Ti_3C_2$ QDs/$In_2S_3$ Evaluated by Degradation of Bisphenol A 10 mg of the $WO_3/Ti_3C_2$ QDs/$In_2S_3$ Z-scheme heterojunction obtained above was placed in 10 mL of Bisphenol A aqueous solution with a concentration of 10 mg/L. BPA was adsorbed for 60 min under dark conditions to reach adsorption equilibrium. After equilibration, a 300 W xenon lamp was used as the light source, and 1 mL of the solution was taken every 15 minutes. The solution was filtered with a 0.22 μwater-based filter and added to the high-performance liquid sample bottle. The sample was tested with a high-performance liquid chromatograph in the mobile phase of deionized water:methanol=3:7 (volume ratio) for the absorption curve at 290 nm ultraviolet wavelength. At the same time, the peak area of Bisphenol A at about 6 min was recorded, and the initial concentration of Bisphenol A was marked as 100% to obtain the photodegradation curve of Bisphenol A.

Figure 5:
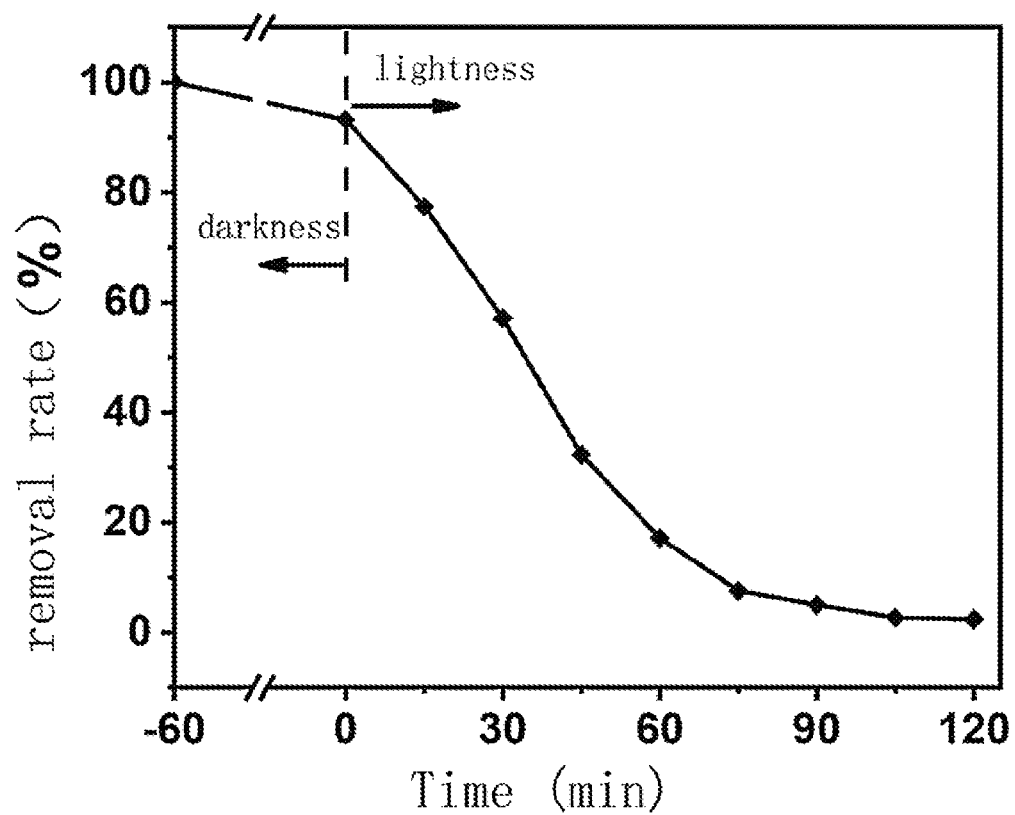
FIG. 5 The photocatalytic degradation curves of BPA for $WO_3/Ti_3C_2$ QDs/$In_2S_3$.

FIG. 5 is the photocatalytic degradation curves of BPA for $WO_3/Ti_3C_2$ QDs/$In_2S_3$. The first 60 minutes is the adsorption equilibrium time under dark conditions. It can be seen from the figure that with the increase of visible light irradiation time, the concentration of Bisphenol A gradually decreases, and the removal rate of Bisphenol A after 120 min of irradiation reaches 97.6%.

Under the same test conditions, the removal rates of Bisphenol A in the water were about 10%, 40%, and 75% after $WO_3$ (Examples 2), $In_2S_3$ (Control Examples 2), and $WO_3In_2S_3$ (Control Examples 3) were illuminated for 120 min.

The dosages of $InCl_3·4H_2O$ and thioacetamide in Examples 3 were adjusted to 176 mg (2.4 mmol) and 67 mg (3.6 mmol), respectively. The other conditions remain unchanged, and the $WO_3/Ti_3C_2$ QDs/$In_2S_3$ Z-scheme heterojunction was obtained. The sample was tested using the same method. After 120 min of light, the removal rate of Bisphenol A in the water was 69%.

The dosages of $InCl_3·4H_2O$ and thioacetamide in Examples 3 were adjusted to 234 mg (3.2 mmol) and 90 mg (4.8 mmol), respectively. The other conditions remain unchanged, and the $WO_3/Ti_3C_2$ QDs/$In_2S_3$ Z-scheme heterojunction was obtained. The sample was tested using the same method. After 120 min of light, the removal rate of Bisphenol A in the water was 71%.

Examples 5: Photocatalytic Activity of $WO_3/Ti_3C_2$ QDs/$In_2S_3$ Evaluated by Degradation of Cr (VI)

5 mg of the $WO_3/Ti_3C_2$ QDs/$In_2S_3$ Z-scheme heterojunction obtained above was placed in 20 mL 10 mg/L potassium dichromate aqueous solution (chromium ion concentration 20 mg/L). Cr (VI) was adsorbed for 60 min under dark conditions to reach adsorption equilibrium. After equilibration, a 300 W xenon lamp was used as the light source, and 1 mL of the solution was taken every 3 minutes. The solution was filtered with a 0.22 μm water-based filter and added to the centrifuge tube. After the chromogenic agent was added, the sample was detected by an ultraviolet spectrophotometer, and the degradation efficiency of hexavalent chromium is calculated from the absorbance. The initial concentration of Cr (VI) was marked as 100%. With the increase of light time, the concentration of Cr (VI) gradually decreased with the gradual decrease of absorbance, thus obtaining a specific degradation curve of Cr (VI).

Figure 6:
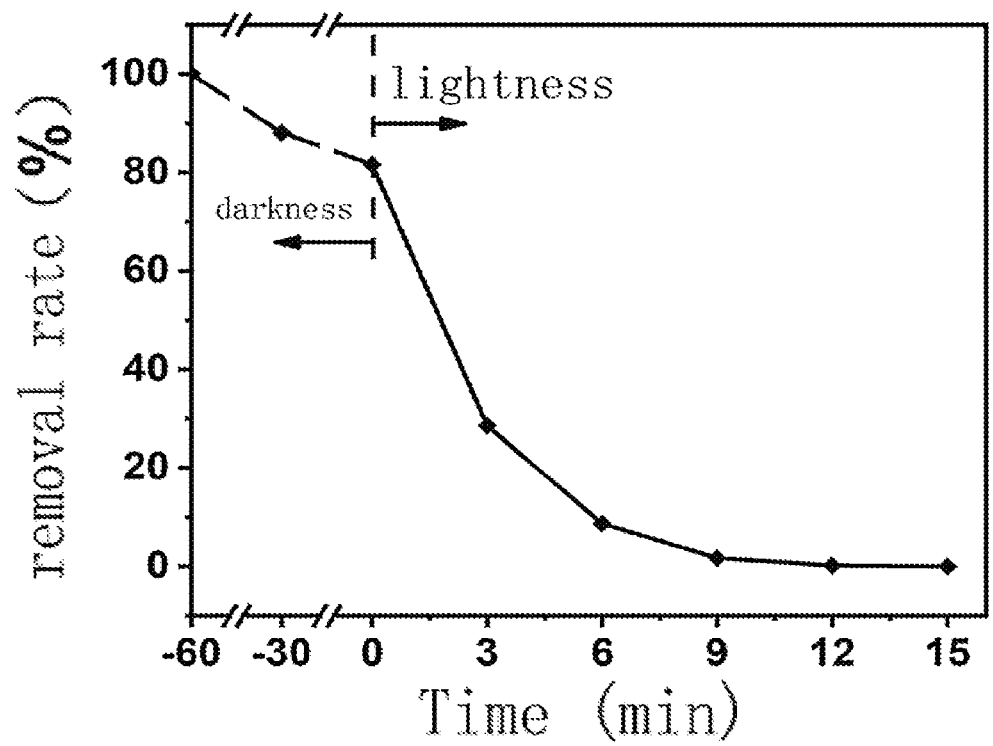
FIG. 6 The photocatalytic degradation curves of Cr (VI) for $WO_3/Ti_3C_2$ QDs/$In_2S_3$.

FIG. 6 is the photocatalytic degradation curves of Cr (VI) for $WO_3/Ti_3C_2$ QDs/$In_2S_3$. The first 60 minutes is the adsorption equilibrium time under dark conditions. It can be seen from the figure that the absorbance of Cr (VI) gradually decreases with the prolonging of the illumination time, indicating that the concentration of Cr (VI) in the water is also decreasing. After 15 minutes of visible light irradiation, the Cr (VI) is completely removed. Under the same test conditions, the removal rates of Cr (VI) in the water were about 21%, 54%, and 87% after $WO_3$ (Examples 2), $In_2S_3$ (Control Examples 2), and $WO_3In_2S_3$ (Control Examples 3) were illuminated for 120 min.

The dosages of $InCl_3·4H_2O$ and thioacetamide in Examples 3 were adjusted to 176 mg (2.4 mmol) and 67 mg (3.6 mmol), respectively. The other conditions remain unchanged, and the $WO_3/Ti_3C_2$ QDs/$In_2S_3$ Z-scheme heterojunction was obtained. The sample was tested using the same method. After 15 min of light, the removal rate of Cr (VI) in the water was 80%.

The dosages of $InCl_3·4H_2O$ and thioacetamide in Examples 3 were adjusted to 234 mg (3.2 mmol) and 90 mg (4.8 mmol), respectively. The other conditions remain unchanged, and the $WO_3/Ti_3C_2$ QDs/$In_2S_3$ Z-scheme heterojunction was obtained. The sample was tested using the same method. After 15 min of light, the removal rate of Cr (VI) in the water was 73%.

$Ti_3C_2$ and $Ti_3C_2$ QDs have no catalytic effect and cannot catalytically remove Bisphenol A and Cr (VI). Under visible light, compared with $WO_3$ nanorods, the catalytic effects of $WO_3/Ti_3C_2$ QDs on Bisphenol A and Cr (VI) were not improved, and the removal rate is only 11% and 24%.

In the present invention, $Ti_3C_2$ QDs are used as the electron transfer medium. Firstly, a mild etching method was used to prepare a preliminary layered $Ti_3C_2$ solution, and then the $Ti_3C_2$ QDs were efficiently prepared by a simple method of multiple freeze-thaw and ultrasound. Immediately, the solution was allowed to stand, so that the quantum dots were evenly loaded on the surface of the $WO_3$ nanorods, and finally, the $WO_3/Ti_3C_2$ QDs/$In_2S_3$ Z-scheme heterojunction was constructed by the reflow method. The as-obtained material has strong absorption in the visible light region of 400-600 nm, which improves the utilization rate of sunlight. At the same time, the Z-scheme heterojunction structure constructed by introducing OD $Ti_3C_2$ QDs has significantly enhanced photocatalytic activity.

The invention claimed is:

1. A method of preparing a $WO_3/Ti_3C_2$ QDs (quantum dots)/$In_2S_3$ Z-scheme heterojunction composite material, comprising:
    preparing $Ti_3C_2$ QDs by a freeze-thaw-ultrasonic method;
    preparing $WO_3$ nanorods by a hydrothermal method;
    immersing the $WO_3$ nanorods in an aqueous solution of the $Ti_3C_2$ QDs and stirring to obtain $WO_3$ nanorods loaded with QDs; and
    refluxing the $WO_3$ nanorods loaded with QDs, an indium compound, and a sulfur compound in a solvent to obtain the $WO_3/Ti_3C_2$ QDs/$In_2S_3$ Z-scheme heterojunction composite material.

2. The method of claim 1, wherein the indium compound is $InCl_3·4H_2O$ or $In(NO_3)_3·4.5H_2O$; the sulfur compound is sodium sulfide nonahydrate, thioacetamide, or thiourea; and the solvent is an alcohol solvent.

3. The method of claim 1, wherein the $WO_3$ nanorods loaded with QDs, the indium compound, and the sulfur compound are refluxed at 90-105° C. for 1-2 hours.

4. The method of claim 1, wherein the $WO_3$ nanorods are obtained by the hydrothermal reaction of sodium tungstate dihydrate, sodium chloride, hydrochloric acid and water.

5. The method of claim 4, wherein the hydrothermal reaction is conducted at 160-180° C. for 24-28 hours.

6. The method of claim 1, wherein the $Ti_3C_2$ QDs are prepared by etching $Ti_3AlC_2$ with a mixture of lithium fluoride and hydrochloric acid and subjecting the $Ti_3AlC_2$ to a freeze-thaw treatment and a water bath ultrasonic treatment.

7. The method of claim 6, wherein the water bath ultrasonic treatment is conducted with an output power of 150-300 W for 1-2 hours.

8. The method of claim 6, wherein the freeze-thaw treatment is conducted before the water bath ultrasonic treatment and repeated 2-6 times.

9. The method of claim 8, wherein the freeze-thaw treatment includes refrigerating the $Ti_3AlC_2$ at 0-5° C., freezing the $Ti_3AlC_2$ at −80-−20° C., and thawing $Ti_3AlC_2$ at room temperature.

10. The $WO_3/Ti_3C_2$ QDs (quantum dots)/$In_2S_3$ Z-scheme heterojunction composite material prepared according to the method of claim 1.

* * * * *